(12) United States Patent
Beauboit et al.

(10) Patent No.: US 12,467,374 B2
(45) Date of Patent: Nov. 11, 2025

(54) TURBINE NOZZLE GUIDE VANE COMPRISING AN ANNULAR SEALING ELEMENT

(71) Applicant: Safran Aircraft Engines, Paris (FR)

(72) Inventors: Kenny Beauboit, Moissy-Cramayel (FR); Matthieu Simon, Moissy-Cramayel (FR); Patrick Jean Laurent Sultana, Moissy-Cramayel (FR); Julian Nicolas Girardeau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/701,033

(22) PCT Filed: Oct. 14, 2022

(86) PCT No.: PCT/FR2022/051938
§ 371 (c)(1),
(2) Date: Apr. 12, 2024

(87) PCT Pub. No.: WO2023/062327
PCT Pub. Date: Apr. 20, 2023

(65) Prior Publication Data
US 2025/0003348 A1    Jan. 2, 2025

(30) Foreign Application Priority Data
Oct. 14, 2021 (FR) .................................. FR2110870

(51) Int. Cl.
*F01D 11/00* (2006.01)
*F01D 9/04* (2006.01)
(Continued)

(52) U.S. Cl.
CPC ............ *F01D 11/001* (2013.01); *F01D 9/041* (2013.01); *F01D 11/02* (2013.01); *F01D 11/04* (2013.01); *F05D 2240/81* (2013.01)

(58) Field of Classification Search
CPC ........ F01D 11/00; F01D 11/001; F01D 11/02; F01D 11/025; F01D 11/04; F05D 2240/126; F05D 2240/55; F05D 2240/81
See application file for complete search history.

(56) References Cited

U.S. PATENT DOCUMENTS 8,602,726 B2 * 12/2013 Bariaud .................. F01D 9/042
415/174.4
8,662,835 B2 * 3/2014 Fachat .................. F01D 11/001
415/173.5
(Continued)

FOREIGN PATENT DOCUMENTS

FR        3002586 A1 *  8/2014  ............ F01D 11/001
FR        3 027 343 B1    4/2016
(Continued)

OTHER PUBLICATIONS

FR_3002586-A1 (Year: 2014).*
(Continued)

*Primary Examiner* — Brian P Wolcott
(74) *Attorney, Agent, or Firm* — BIRCH, STEWART, KOLASCH & BIRCH, LLP

(57) ABSTRACT

The present invention relates to a nozzle guide vane for a turbine, having an axis of revolution and comprising:
a flange extending radially relative to the axis; —a ring seal mounted on the flange and comprising an inner face that is configured to bear an abradable element; —a ventilation cavity delimited radially on the inside by an outer face of the ring seal and downstream by an upstream face of the flange; —a baffle configured to guide an airflow toward the ventilation cavity; and—at (Continued)

least one through-opening formed in the ring seal and configured to put the ventilation cavity in fluidic communication with the inner face of the ring seal.

8 Claims, 4 Drawing Sheets

(51) Int. Cl.
    *F01D 11/02*     (2006.01)
    *F01D 11/04*     (2006.01)

(56) References Cited

U.S. PATENT DOCUMENTS

| | | | | |
|---|---|---|---|---|
| 8,864,451 | B2 * | 10/2014 | Piggott | F01D 11/001 |
| | | | | 415/199.5 |
| 9,080,449 | B2 * | 7/2015 | Bridges | F01D 11/005 |
| 9,631,515 | B2 * | 4/2017 | Oyarbide | F01D 25/12 |
| 9,631,557 | B2 | 4/2017 | Luneau et al. | |
| 9,644,488 | B2 * | 5/2017 | Boeck | F01D 11/10 |
| 9,683,452 | B2 * | 6/2017 | Luneau | F01D 11/001 |
| 10,677,080 | B2 * | 6/2020 | Klingels | F02C 7/28 |
| 10,808,561 | B2 * | 10/2020 | Schlemmer | F02C 7/28 |
| 10,865,651 | B2 * | 12/2020 | Schlemmer | F01D 11/003 |
| 10,920,593 | B2 * | 2/2021 | Millier | F01D 11/02 |
| 11,781,442 | B2 * | 10/2023 | Girardeau | F01D 11/24 |
| | | | | 415/173.4 |
| 12,116,897 | B2 * | 10/2024 | Sultana | F01D 11/001 |
| 2019/0284946 | A1 * | 9/2019 | Berdowski | F01D 11/20 |
| 2024/0368993 | A1 * | 11/2024 | Lemonnier | F01D 5/084 |

FOREIGN PATENT DOCUMENTS

| | | | |
|---|---|---|---|
| FR | 3 101 374 A1 | 4/2021 | |
| FR | 3 107 298 A1 | 8/2021 | |
| FR | 3 108 938 A1 | 10/2021 | |
| GB | 2606552 A * | 11/2022 | F01D 11/001 |
| WO | WO 2012/150424 A1 | 11/2012 | |
| WO | WO 2013/001240 A1 | 1/2013 | |

OTHER PUBLICATIONS

French Search Report for French Application No. FR2110870, dated May 2, 2022.

International Search Report and Written Opinion of the International Searching Authority for International Application No. PCT/FR2022/051938, dated Jan. 24, 2023.

* cited by examiner

TURBINE NOZZLE GUIDE VANE COMPRISING AN ANNULAR SEALING ELEMENT

TECHNICAL FIELD disclosure concerns a turbojet engine and more generally a turbine engine comprising a turbine nozzle having a radially inner surface bearing an annular sealing element of a seal of labyrinth type, this annular sealing element being in an abradable material intended to cooperate with knife-edges carried by a rotor facing this annular sealing element.

BACKGROUND

A gas turbine engine, from upstream to downstream in the direction of the flow of gases through the turbine engine, generally comprises: a fan, one or more compressor stages for example a low pressure compressor and a high pressure compressor, a combustion chamber, one or more turbine stages for example a high pressure turbine and a low pressure turbine, and a gas exhaust nozzle 8.

In manner known per se, turbines are produced in the form of a succession of stages, each comprising a wheel of mobile blades (rotor) rotating in front of a wheel of fixed vanes (stator, or nozzle guide vanes) configured to convert combustion energy to driving energy, in particular to drive the compressor stages and the fan. The rotor discs of the turbine are centred on a longitudinal axis X of the turbine engine and are generally assembled together by means of shell rings at the upstream disc and downstream disc. Each assembly of nozzle guide vanes comprises a plurality of fixed vanes circumferentially distributed about the axis.

The nozzle guide vanes are fixed vanes configured to accelerate and divert a flow of combustion gas in the direction of the mobile blades immediately downstream.

It is known to place a dynamic seal radially inside turbine nozzle guide vanes to reduce the circulation of gases outside the primary annular duct within which the blades and vanes extend. Said seal generally comprises a ring seal bearing an abradable element that is secured to the nozzle guide vanes and one or more knife-edges secured to the rotor.

When the turbojet engine is in operation, the nozzle guide vanes are exposed to higher temperatures than the disc of the mobile wheel, and the thermal inertia of the nozzle guide vanes is generally lower than that of the disc which leads to variation in the clearance between the sealing ring and the knife-edges. This leads to an increase in leakage flow when the aforementioned clearance increases, and to accelerated wear of the abradable element when this clearance decreases.

Document FR 3 027 343 discloses an assembly solution allowing radial movement between the ring seal and the nozzle guide vanes. However, the sealing of said assembly is sensitive to variations in temperature since expansion of the ring seal causes opening of the clearances between the abradable element and the opposite-facing knife-edges, thereby deteriorating engine performance. The cooling flow injected between the abradable element and the knife-edges does not mix with the hot air derived from the airstream leaking between the nozzle guide vanes and the immediately adjacent rotating disc, which means that the variations in temperature of the ring seal are dependent upon the free expansion of the leakage flow of hot air from the airstream. In transitional phases, this means that the ring seal expands under the effect of an increase in temperature translating as opening of sealing clearances, increased permeability of the seal and hence reduced performance of the seal.

Finally, the difference in temperature of the ventilation cavities upstream and downstream (either side of the sealing) is substantial, generating a difference in temperature between the ring securing flanges and creating differential thermal expansion which could block radial movement of the ring seal in relation to the turbine nozzle guide vanes.

SUMMARY

It is one objective to overcome the aforementioned disadvantages by proposing nozzle guide vanes comprising a seal having performance that is less sensitive to variations in temperature, in particular when the sealing comprises a ring seal mounted with radial clearance on the nozzle guide vanes, and having an improved lifetime.

For this purpose, in a first aspect, turbine nozzle guide vanes are proposed having an axis of revolution and comprising:
  a flange extending radially relative to the axis;
  a ring seal mounted on the flange and comprising an inner face configured to bear an abradable element;
  a ventilation cavity radially delimited on the inside by an outer face of the ring seal and downstream by an upstream face of the flange;
  a deflector configured to guide an airflow toward the ventilation cavity; and
  at least one through-opening formed in the ring seal and configured to place the ventilation cavity in fluid communication with the inner face of the ring seal.

Some preferred but nonlimiting characteristics of the turbine nozzle guide vanes according to the first aspect are the following, taken alone or in combination:
  the deflector is mounted on one from among the flange and ring seal so that it extends substantially radially within the ventilation cavity;
  the deflector is secured to a bent upstream edge of the ring seal;
  the upstream edge extends radially inwardly;
  the turbine nozzle guide vanes comprise bent metal sheet secured to an upstream edge of the ring seal, the at least one opening passing through the deflector;
  the deflector comprises a substantially planar or frusto-conical metal sheet;
  the deflector extends radially relative to the axis;
  the deflector is brazed onto one from among the flange and ring seal, or it is in one piece with the ring seal; and/or
  the ring seal is mounted to be radially mobile relative to the flange.

In a second aspect, the disclosure proposes a turbine comprising turbine nozzle guide vanes according to the first aspect.

In a third aspect, the disclosure proposes a turbine engine comprising a turbine according to the second aspect and an additional turbine, the rotating speed of the additional turbine being greater than the rotating speed of the turbine.

In a fourth aspect, the disclosure proposes an aircraft comprising a turbine engine according to the third aspect.

DESCRIPTION OF THE FIGURES

Other characteristics, objectives and advantages of the invention will become apparent from the following nonlimiting description which is solely illustrative and is to be read in connection with the appended drawings in which.

In all the Figures, similar elements carry same references.

DETAILED DESCRIPTION

Figure 1:
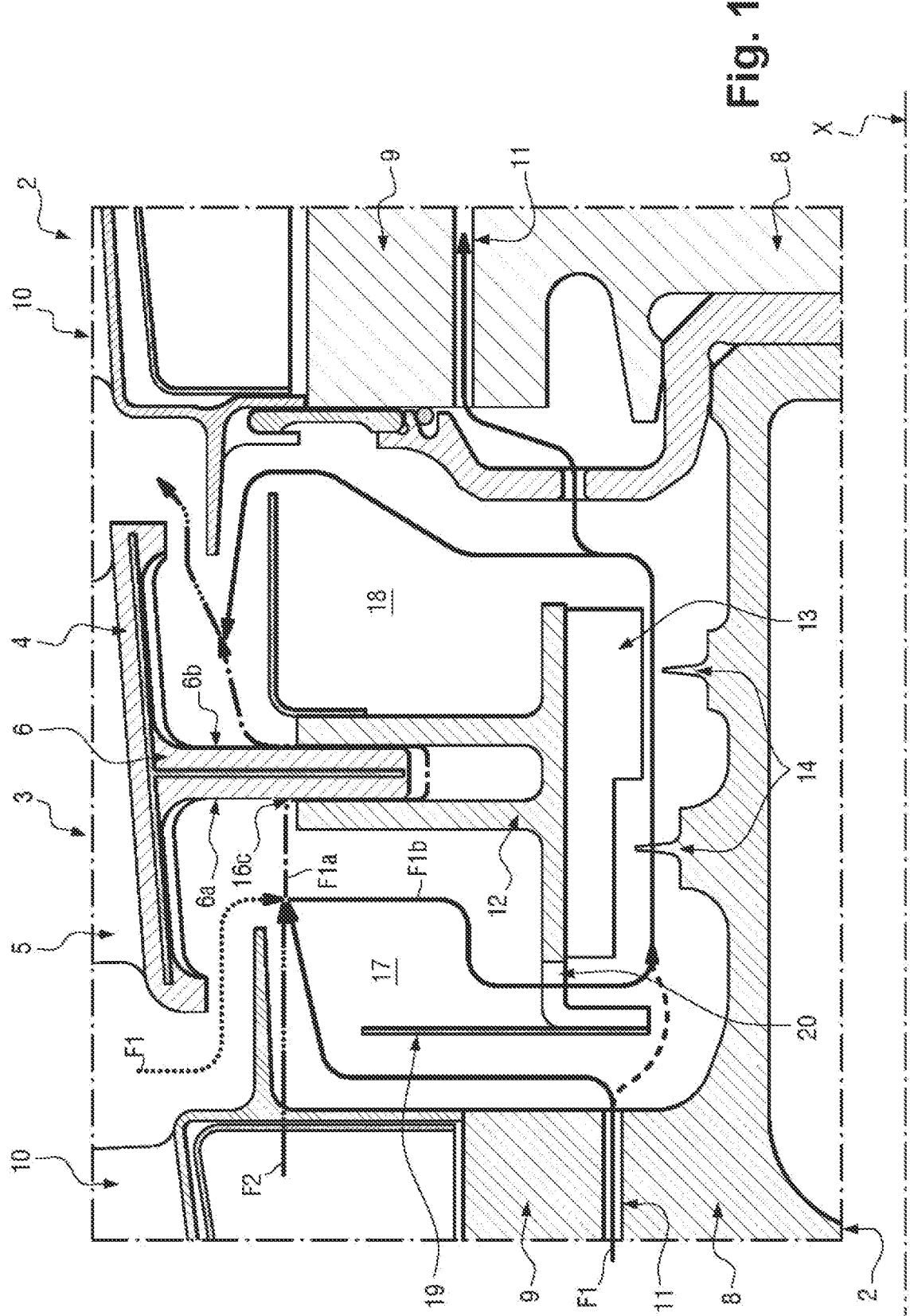
FIG. 1 is a cross-sectional view of an example of a turbine comprising nozzle guide vanes conforming to one embodiment, the view schematically illustrating the different fluids (gases) circulating underneath the nozzle guide vanes.

In the present application, the upstream and downstream are defined in relation to the normal direction of flow of gases in the turbine engine 1 (in particular of the aircraft 100), and hence along the nozzle guide vanes 3 of the low pressure turbine 2. The axis X of the nozzle guide vanes 3 is the axis X about which the nozzle guide vanes 3 extend, which corresponds to the axis of revolution X of the rotor 7 of the turbine 2. An axial direction corresponds to the direction of the axis X, a radial direction is a direction perpendicular to this axis X and passing therethrough. Also, a circumferential direction corresponds to a direction perpendicular to axis X but not passing therethrough. Unless otherwise specified, inner (or internal) and outer (or external) are respectively used with reference to a radial direction, so that the inner part or surface of an element is closer to axis X than the outer part or surface of the same element.

In manner known per se, nozzle guide vanes 3 in particular of a low pressure turbine 2 comprise a hub platform 4 provided with a plurality of fixed vanes 5 circumferentially distributed around the hub platform 4. The hub platform 4 in particular comprises a flange 6 which extends radially inwardly relative to the vanes 5.

The nozzle guide vanes 3 can be segmented and comprise a plurality of guide vane segments 3 secured together end to end about the axis X. As a variant, the nozzle guide vanes 3 can be integrally formed in one piece, in which case the segments of the nozzle guide vanes 3 are monolithic.

The turbine 2 also comprises a rotor 7 comprising a plurality of discs 8 each comprising a rim 9 and blades 10. The blades 10 are positioned and secured in slots 11 formed in the rim 9 of the corresponding disc 8, and extend radially from the rim 9.

The nozzle guide vanes 3 extend between two adjacent discs 8 of the rotor 7 of the turbine 2. Preferably the turbine 2 comprises a succession of stages each comprising a disc 8 of the rotor 7 rotating in front of an associated nozzle guide vane 3.

The turbine 2 also comprises a seal comprising a ring seal 12 connected to the flange 6 via a sliding connection and configured to carry a first sealing element 13, and a second sealing element 14 configured to cooperate with the first sealing element 13, and for example possibly being borne by a support fixed between the two adjacent discs 8 of the rotor 7 of the turbine 2. The first sealing element 13 may comprise an abradable element 13 such as a honeycomb structure secured onto the inner face 15a of the ring 12. The second sealing element 14 may then comprise knife-edges 14 extending radially from the support. In the remainder hereof, an example of a seal is described comprising an abradable element 13 and knife-edges 14. However this is not limiting and the invention can be applied to seals comprising other sealing elements.

More specifically, the flange 6 extends substantially radially from the hub platform 4 in the direction of the second sealing elements (i.e. opposite the vanes) and has an upstream face 6a and downstream face 6b that are substantially radial.

The ring seal 12 can be added and connected to the flange 6 via a sliding connection. It comprises a metal sheet comprising an axial portion 15 and a radial portion 16. The axial portion 15 has the inner face 15a configured to receive the abradable element 13, and an outer face 15b opposite the inner face 15a which is configured to extend facing the hub platform 4. The abradable element 13 is directly secured onto the inner face 15a of the axial portion 15. The axial portion 15 also has an upstream edge 15c and a downstream edge 15d.

The radial portion 16 extends from the outer face 15b of the axial portion 15 and is configured to be mounted on the flange 6. The radial portion 16 in particular can be centred in relation to the axial portion 15.

In one embodiment, the radial portion 16 is mounted on the flange 6 in a manner to provide radial clearance between the ring seal 12 and the flange 6. For this purpose, the radial portion 16 may comprise an upstream end-plate 16a and a downstream end-plate 16b configured to come into contact with the upstream face 6a and downstream face 6b respectively of the flange 6. Reference can be made to document FR 3 027 343 for more details on mounting with radial clearance of the ring seal 12 on the flange 6.

The ring 12 and the flange 6 together define an upstream ventilation cavity 17 and downstream ventilation cavity 18. The upstream cavity 17 is delimited upstream by the rotating disc 8 of the rotor 7 immediately upstream, downstream by the upstream face 6a of the flange 6, radially inwardly by the outer face 15b of the axial portion of the ring 12, and radially outwardly by the inner surface of the hub platform 4. The downstream cavity 18 is delimited upstream by the downstream face 6b of the flange, downstream by the rotating disc 8 of the rotor 7 immediately downstream, radially inwardly by the outer face 15b of the axial portion of the ring 12, and radially outwardly by the inner surface of the hub platform 4.

The mounting with clearance of the ring 12 on the flange 6 allows the passing of air (zone 16c) between the endplates 16a, 16b of the ring 12 and flange 6, thereby placing the upstream cavity 17 and downstream cavity 18 in fluid communication, facilitating ventilation thereof.

In manner known per se, a flow of cooling gas F1 (derived in particular from an upstream part of the turbine engine 1, for example from a compressor section) passes through the bottom part of the slots 11 and is injected between the abradable element 13 and the knife-edges 14 of the seal, to cool the seal and ensure the tightness thereof.

Also, it is possible that gases F2 may leak at the outer surface of the rim 9 of the disc 8 immediately upstream, and are injected into the upstream cavity 17. These gases F2 are relatively hot and therefore have the effect of heating the upstream cavity 17.

To improve the tightness of the seal and to increase the lifetime thereof, the nozzle guide vanes 3 also comprise a deflector 19 configured to guide an airflow toward the upstream cavity 17. For this purpose, the deflector 19 can in particular be mounted on one from among the flange 6 and the ring 12, so that it extends substantially radially within the upstream cavity 17. Also, at least one through-opening 20 is formed in the ring seal 12 to place the portion of upstream cavity 17 lying between the deflector 19 and the outer face 15b of the ring 12 in fluid communication with the inner face 15a of the ring seal 12.

The deflector 19 and the through opening(s) 20 therefore allow forcing of the cooling fluid F1 (gas) derived from the slots 11 of the disc 8 of the rotor 7 immediately upstream of the nozzle guide vanes 3, to mix with the hot gases F3, F2 derived from the airstream and from the rim 9 of the disc 8, to reduce the temperature gradients between the upstream cavity 17 and downstream cavity 18. The rotation of the rotor 7 of the turbine 2 entrains the cooling fluid F1 radially outwardly, so that the fluid F1 moves up along the deflector 19 as far as the upstream cavity 17 where it meets the hot gases F2, F3. The mixing of the cooling fluid F1 with the hot gases F2, F3 therefore allows cooling of the upstream cavity 17 (and upstream end-plate 16a). If appropriate, a part F1a of the mixture obtained could then pass between the end-plates 16a, 16b and the flange 6 through the passageway 16a provided for this purpose, thereby cooling the downstream cavity 18, whilst another part F1b moves down towards the knife-edges 14 via the through-opening(s) ensuring the tightness of the seal.

The deflector 19 is substantially radial to axis X. By «substantially radial», it is meant herein that the deflector 19 extends over a plane able to form an angle of between −20° and +20° with a plane normal to axis X. In one embodiment, the deflector lies in the plane normal to axis X, to provide efficient guiding of the cooling fluid towards the upstream cavity 17.

Preferably, several through-openings 20 are formed in the ring 12 to ensure a sufficient passageway for the gas flow derived from the upstream cavity 17. As a variant, an oblong orifice 20 can be formed in the deflector 19 and/or ring 12. Since the seal is calibrating, it is not necessary for the cross-section of the passageway of the opening(s) 20 to take part in the calibration of the gas flow in the seal.

In a first embodiment, the deflector 19 is secured to the ring 12, for example by brazing or mechanical attachment (bolting, etc.). The deflector 19 then comprises an inner radial end arranged in the vicinity of the ring seal 20 and an outer radial end extending into the upstream cavity 17.

Figure 2:
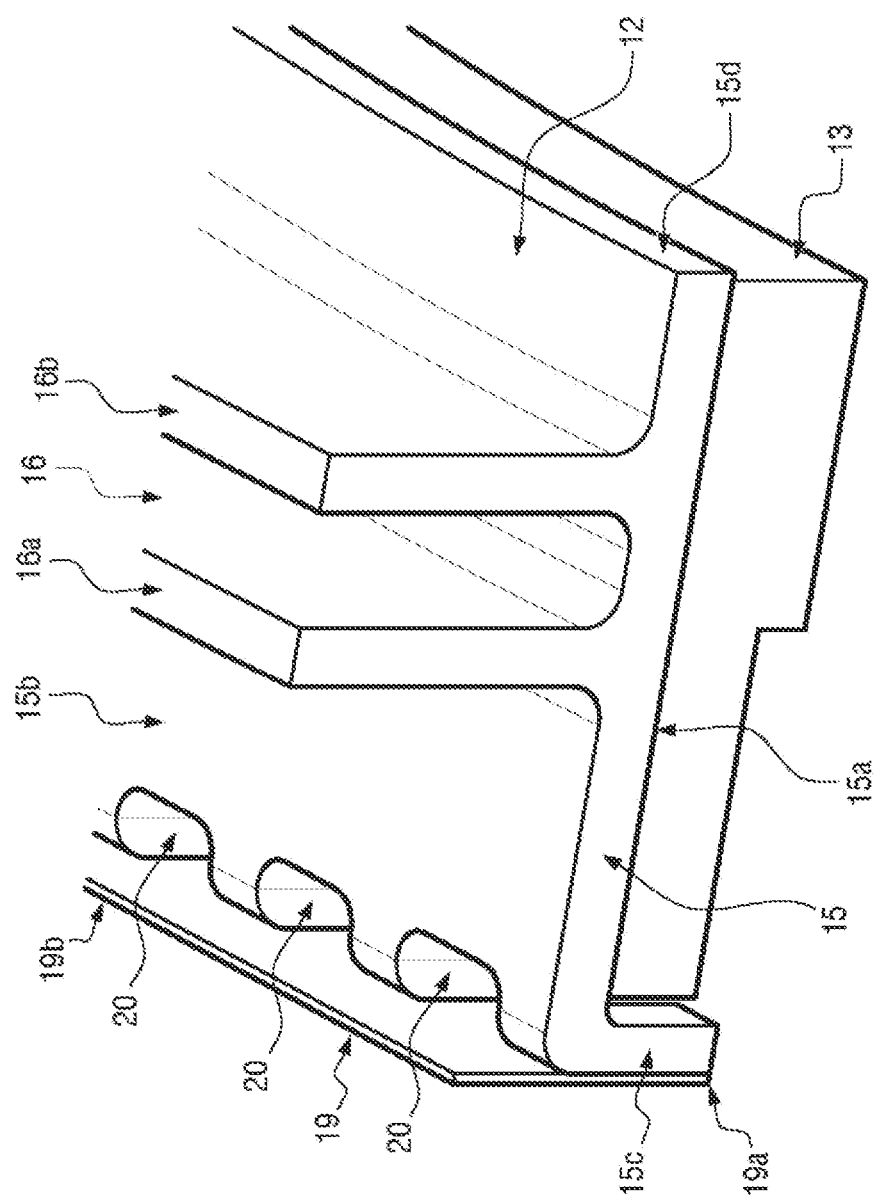
FIG. 2 is a partial, perspective view of an example of a ring seal and deflector conforming to one embodiment.
Figure 3:
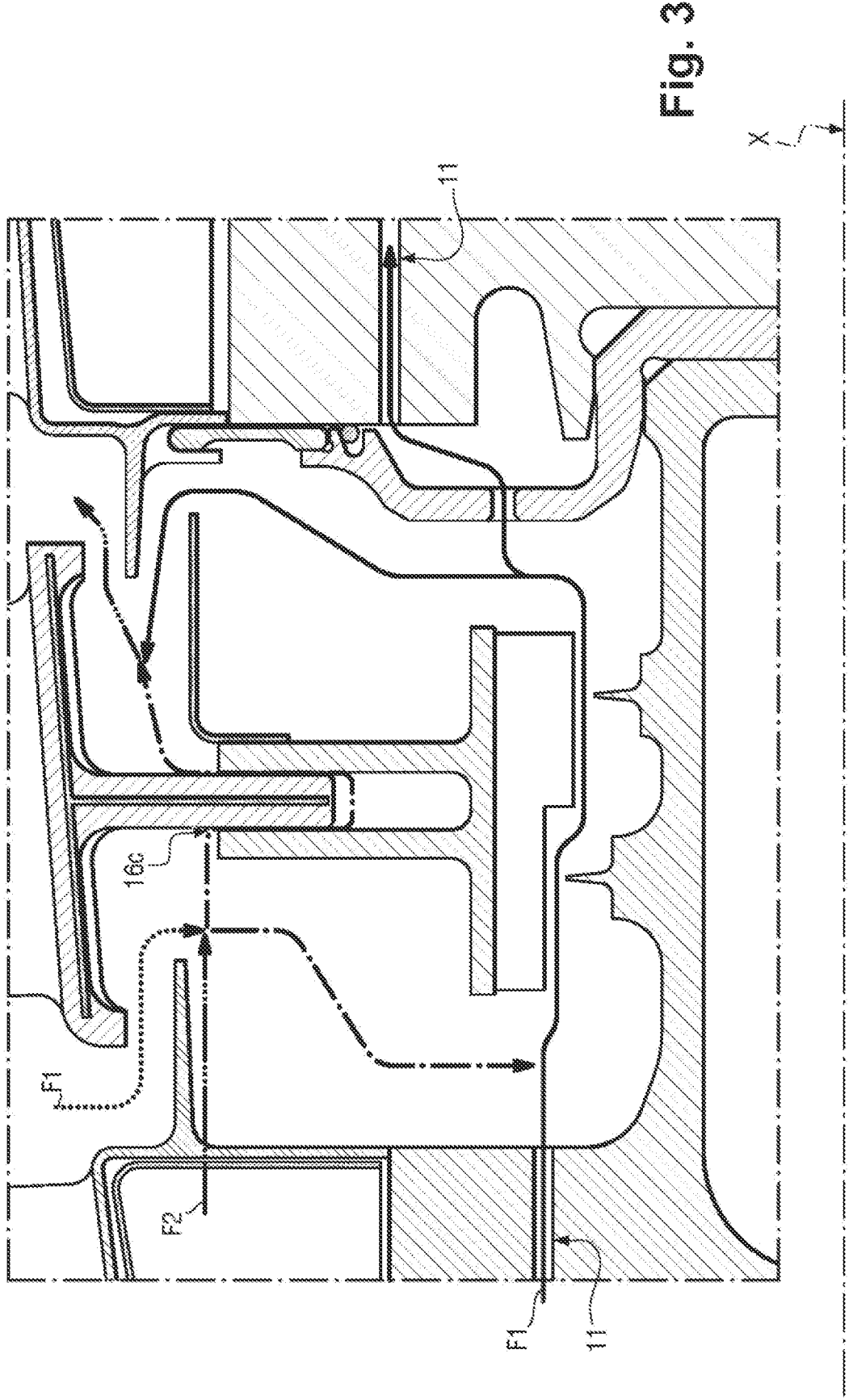
FIG. 3 is a cross-sectional view of an example of a conventional turbine comprising nozzle guide vanes, the view schematically illustrating the different fluids circulating underneath the nozzle guide vanes.

For example, the deflector 19 can be secured to the upstream edge 15c of the ring 12 and can extend radially outwardly in the upstream cavity 17. To facilitate securing of the deflector 19 onto the ring 12, one from among at least the ring 12 and the deflector 19 comprises a bent edge on which there is attached the other from among the deflector 19 and ring 12. For example, FIGS. 1 and 2 illustrate the case of a ring 12 comprising a bent upstream edge 15c, the deflector 19 then being secured onto the bent portion of the upstream edge 15c. Preferably the bent portion of the upstream edge 15c of the ring 12 extends radially inwardly (i.e. toward axis X) preferably as far as the outlet from the slot 11 (i.e. the end of the upstream edge 15c lies facing the outlet of the slot 11), to form an obstacle against the cold cooling fluid F1 derived from the slot 11 of the disc 8 immediately upstream. With this configuration, it is possible to further force the cooling fluid F1 to move up toward the upstream cavity 17 rather than flowing directly toward the seal.

The deflector 19 comprises a substantially planar metal sheet comprising a radially inner edge 19a and radially outer edge 19b. The radially inner edge 19a and radially outer edge 19b are preferably annular. The deflector 19 can be in one piece or it can comprise a plurality of sectors attached end to end possibly with overlap.

In this embodiment, the through-opening(s) 20 are formed in the axial portion 15a of the ring 12, close to the bend. Preferably the opening(s) 20 are offset relative to the abradable element 13: they are therefore formed in that part of the ring 12 not having an abradable element 13 i.e. close to the bend of the upstream edge 15c. For example, the openings 20 can be formed in the bent portion of the upstream edge 15c and extend radially within the bent portion so as to open out along the deflector 19 (see FIG. 2). The cooling fluid F1b therefore flows through the openings 20 along the deflector 19 before reaching the seal.

If the deflector 19 has a bend, it further comprises an annular sheet in one piece with the radially inner edge of the metal sheet. The deflector 19 can then be added onto and secured onto the outer face 15b of the ring 12 close to the upstream edge 15c thereof. The opening(s) are then formed so that they match in the deflector 19 and in the axial portion 15a of the ring 12, at the overlap thereof.

As a variant, the deflector 19 is in one piece with the ring 12 and can be obtained by additive manufacturing. The openings 20 are then formed close to the junction between the deflector 19 and the axial portion 15a of the ring 12. The deflector 19 can simply form a bend with the axial portion 15a of the ring 12, or as a variant it may comprise a radially outer portion which extends from the upstream edge 15c of the ring 12 in the direction of the upstream cavity 17, and a radially inner portion which extends from the upstream edge 15c of the ring 12 in the direction of axis X to form an obstacle against the passing of cold fluid F1 arriving from the slot 11.

In a second embodiment (not illustrated in the Figures), the deflector 19 is secured onto the radial portion 16 of the ring 12 or on the flange 6. The deflector 19 then comprises perforations to allow circulation of the fluid F1 toward the openings 20 of the ring 12 and optionally (depending on the position relative to the end-plates 16a, 16b) toward the pathway of gases 16c at the end-plates 16a, 16b. In addition, the deflector 19 comprises an inner radial end extending within the upstream cavity 17, and an outer radial end arranged in the vicinity of the radial portion 16 of the ring seal 20.

The deflector 19 may comprise a metal sheet in the form of a channel comprising a first planar sheet configured to be secured onto the flange 6 or radial portion 16 of the ring 12, a second planar sheet extending substantially radially in the upstream cavity 17, and a central sheet joining together the first and second metal sheets.

As a variant, the flange 6 or the radial portion 16 of the ring 12 may comprise a bent metal sheet which can be brazed onto the radial portion or the flange 6. The deflector 19 may then comprise a bent metal sheet secured (e.g. by brazing) onto the bent metal sheet of the flange 6 or the radial portion.

In a further variant, the deflector 19 may comprise a metal sheet bent radially inwardly which is in one piece with the flange 6 or the radial portion 16 of the ring 12.

Figure 4:
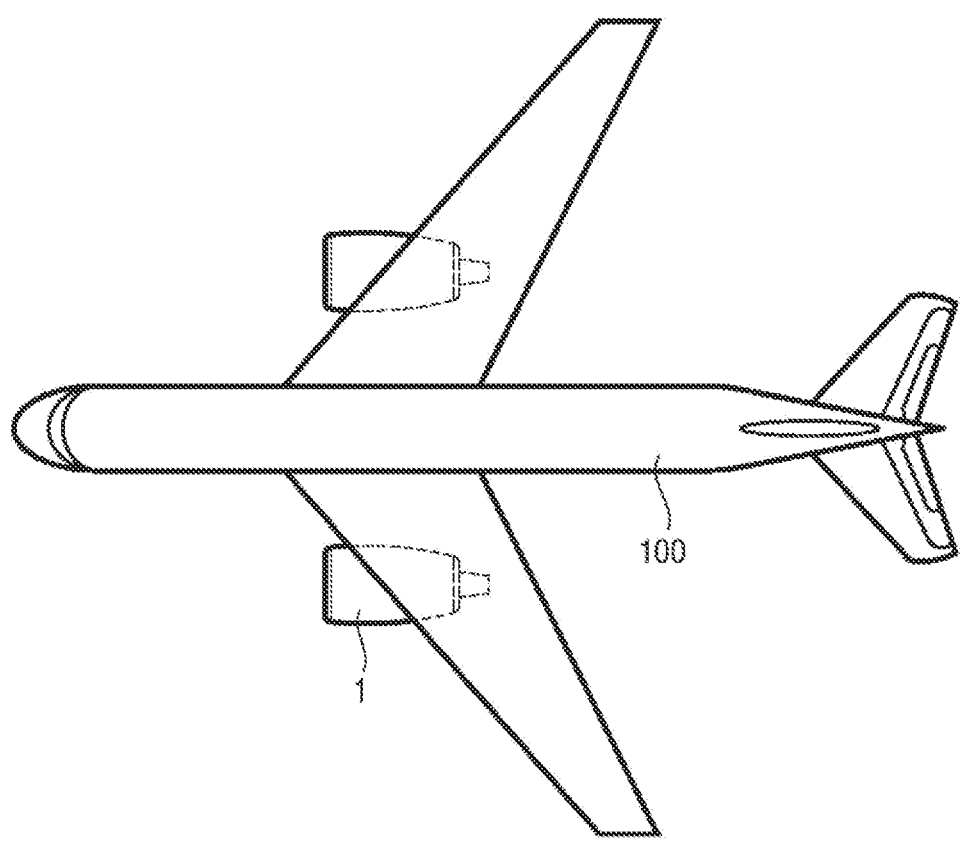
FIG. 4 illustrates an aircraft comprising two turbine engines conforming to one embodiment.

FIG. 4 illustrates the circulation of the different airflows F1, F2, F3 in conventional nozzle guide vanes. The hot gases F3 derived from the airstream leak into the area lying between the hub platform 4 of the nozzle guide vanes 3 and the disc 8 of the rotor 7 immediately upstream. In parallel, a flow of cooling air F1 arriving from the slot 11 of this disc 8 is injected between the abradable element 13 and the knife-edges 14 to cool the seal. Finally, a hot leakage flow F2 in the vicinity of the rim 9 of the discs 8 can be injected into the upstream cavity 17. It follows from this Figure that the cooling fluid F1 does not move up toward the upstream cavity 17, which is therefore very hot, and solely cools the seal. It also follows that there is a substantial difference in temperature between the upstream cavity 17 and the downstream cavity 18, and also between the upstream end-plate 16a and downstream end-plate 16b of the ring 12.

By way of comparison, the circulation of the airflows F1, F2 and F3 is illustrated in FIG. 1 which illustrates nozzle guide vanes 3 conforming to one embodiment. The hot gases F3 derived from the airstream are mixed in the upstream cavity 17 with the cooling fluid F1 moving up along the deflector 19, and with the hot leakage flow F2 from the rims 9 of the discs 8. The total temperature of the upstream cavity 17 is therefore much lower than in FIG. 4. The differences in temperature between the upstream cavity 17 and downstream cavity 18 and between the upstream end-plate 16a and downstream end-plate 16b of the ring 12 are also lower, the gases F1a circulating between the end-plates 16a, 16b and the flange 6 also having a lower temperature having been mixed with the fluid F1 arriving from the slots 11. Finally, one part F1b of the cold fluid is returned to the seal via the openings 20 to ensure cooling of the seal.

Since the upstream cavity 17 is constantly supplied with a strong cooling flow, the ring 12 undergoes smaller variations in temperature during the lifetime of the turbine engine 1 further to mixing of the gases F1, F2, F3 in the upstream cavity 17. The ring 12 is therefore less subject to thermal expansions.

Since the temperatures of the upstream 17 and downstream 18 cavities are more homogeneous, the differential thermal expansions between the two end-plates 16a, 16b are reduced (even eliminated). The risks of blocking of the ring 12 (and in particular of the radial movements thereof in relation to the flange 6) are therefore obviated.

The deflector 19 is preferably in metal and can be prepared in the same material as the flange 6 or ring 12. For example, the deflector 19 may comprise an alloy of aluminium steel, etc.

The invention can be applied to any axial turbine 2 composed of a succession of mobile stages (rotor 7) and static stages (nozzle guide vanes 3), and in particular to turbomachines 1 (and derivatives) and gas turbines. The ring 12 of the turbine 2 can be free i.e. having radial clearance with the flange 6, or as a variant it can be fixed in relation to the flange 6. The invention finds particular application to turbines 2 having significant leakage flow from the airstream.

The invention claimed is:

1. A turbine nozzle guide vane having an axis of revolution and comprising:
    a flange extending radially relative to the axis of revolution;
    a ring seal mounted on the flange and having an inner face configured to bear an abradable element;
    a ventilation cavity radially delimited on an inside by an outer face of the ring seal and downstream by an upper face of the flange;
    a deflector configured to guide a cooling fluid toward the ventilation cavity, the deflector being secured onto a bent upstream edge of the ring seal which extends radially inwardly;
    said deflector being mounted in front and upstream of the ring seal and extending substantially radially in the ventilation cavity, said deflector facing the outlets of slots passing through the rotor disk, thereby forming an obstacle to the cooling fluid at said outlets and forcing the cooling fluid to move toward the ventilation cavity rather than flowing directly toward the ring seal; and
    at least one through-opening formed in the ring seal and configured to place the ventilation cavity in fluid communication with the inner face of the ring seal,
    part of the cooling fluid being returned to the ring seal via said at least one through-opening.

2. A turbine nozzle guide vane, having an axis of revolution and comprising:
    a flange extending radially relative to the axis of revolution;
    a ring seal mounted on the flange and having an inner face configured to bear an abradable element;
    a ventilation cavity radially delimited on an inside by an outer face of the ring seal and downstream by an upper face of the flange;
    a deflector configured to guide an airflow toward the ventilation cavity, the deflector being secured onto a bent upstream edge of the ring seal which extends radially inwardly; and
    at least one through-opening formed in the ring seal and configured to place the ventilation cavity in fluid communication with the inner face of the ring seal,
    wherein the deflector comprises a bent metal sheet secured on the bent upstream edge of the ring seal.

3. The turbine nozzle guide vane according to claim 1, wherein the deflector comprises a substantially planar or frustoconical metal sheet.

4. The turbine nozzle guide vane according to claim 1, wherein the deflector extends radially relative to the axis of revolution.

5. The turbine nozzle guide vane according to claim 1, wherein the deflector is brazed onto the ring seal or is integral with the ring seal.

6. The turbine nozzle guide vane according to claim 1, wherein the ring seal is mounted to be radially mobile relative to the flange.

7. A turbine comprising a nozzle guide vane according to claim 1.

8. A turbine engine comprising a turbine according to claim 7 and an additional turbine, a rotating speed of the additional turbine being greater than a rotating speed of the turbine.

* * * * *